United States Patent [19]
Schell

[11] Patent Number: 5,367,296
[45] Date of Patent: Nov. 22, 1994

[54] COMMUNICATION SIGNAL DEVICE

[76] Inventor: William F. Schell, P.O. Box 6152, Kamuela, Hi. 96743

[21] Appl. No.: 19,631

[22] Filed: Feb. 18, 1993

[51] Int. Cl.[5] ............................................. G08B 23/00
[52] U.S. Cl. ............................................ 340/984; 455/89
[58] Field of Search ............... 340/984, 326, 331, 332, 340/333, 321; 342/57, 357; 455/89, 95, 99

[56] References Cited

U.S. PATENT DOCUMENTS

| | | | |
|---|---|---|---|
| 2,475,578 | 7/1949 | Halstead | 455/89 |
| 2,561,421 | 7/1951 | Seale et al. | 455/89 |
| 2,984,740 | 5/1961 | Madland et al. | 455/89 |
| 3,181,135 | 4/1965 | Zoglio | 455/99 |
| 3,603,952 | 9/1971 | Smith | 455/99 |
| 3,650,444 | 3/1972 | Gibson et al. | 455/89 |
| 3,824,465 | 7/1974 | Blough | 455/89 |
| 4,225,970 | 9/1980 | Jaramillo et al. | 455/89 |
| 4,647,929 | 3/1987 | Jacobs | 340/984 |
| 4,718,110 | 1/1988 | Schaefer | 455/89 |
| 5,155,860 | 10/1992 | McClure | 455/89 |

FOREIGN PATENT DOCUMENTS 2149621  6/1985  United Kingdom ............... 340/984

*Primary Examiner*—Brent Swarthout
*Attorney, Agent, or Firm*—Michael I. Kroll

[57] ABSTRACT

The present invention relates to a communication signal device. The communication signal device is mounted on a boat and contains a radio, a light beacon, and an emergency position indicating radio beacon.

1 Claim, 3 Drawing Sheets

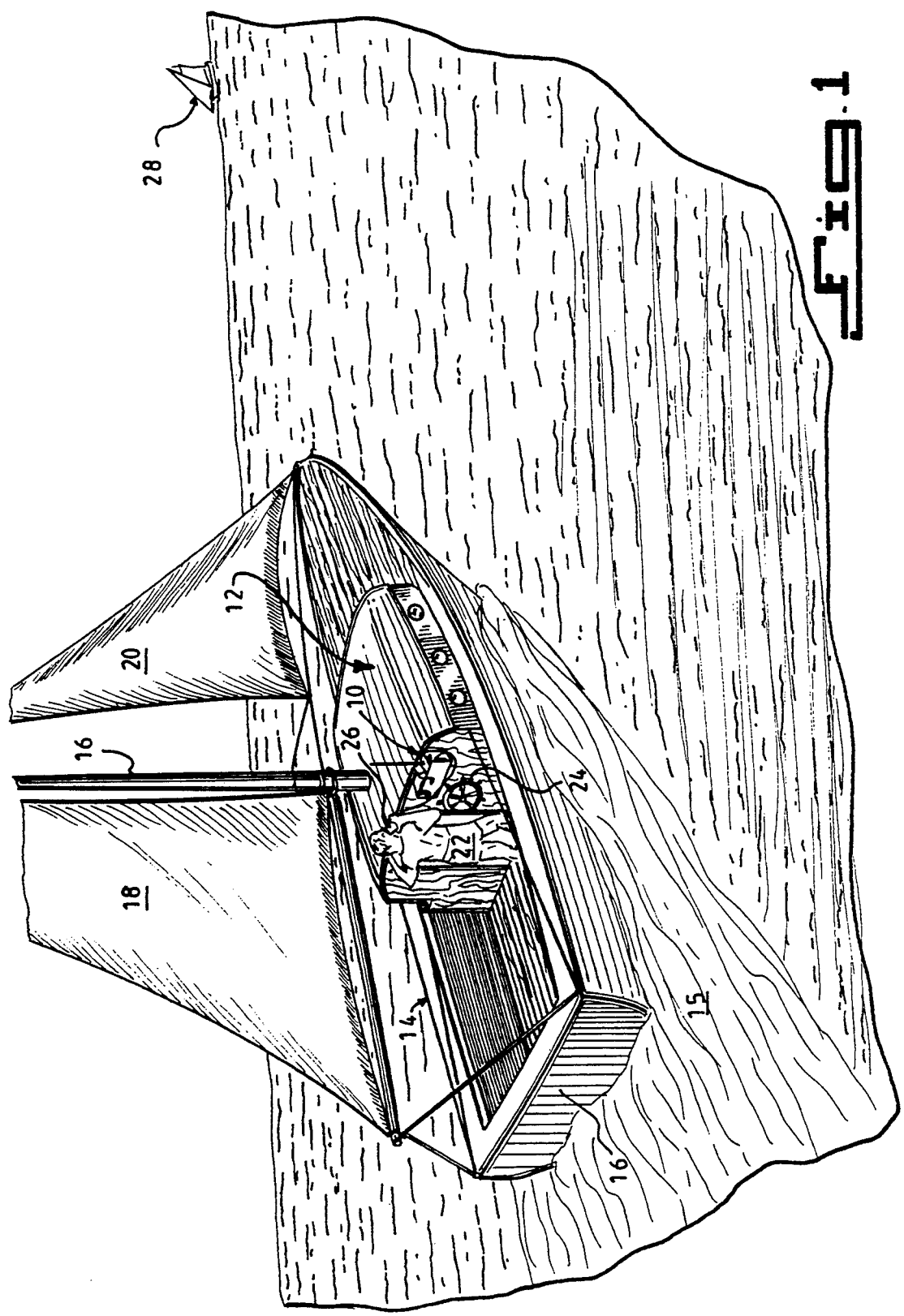

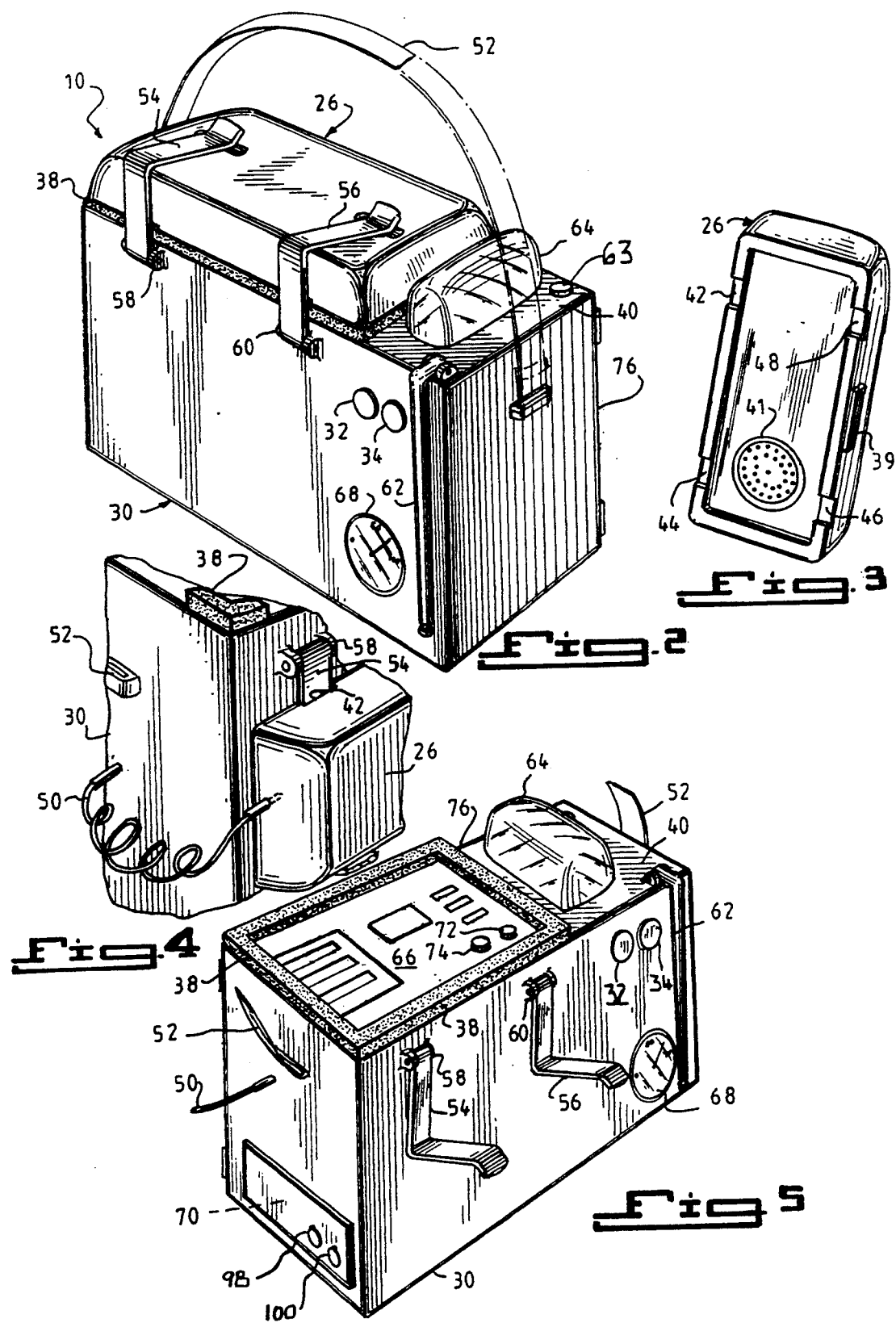

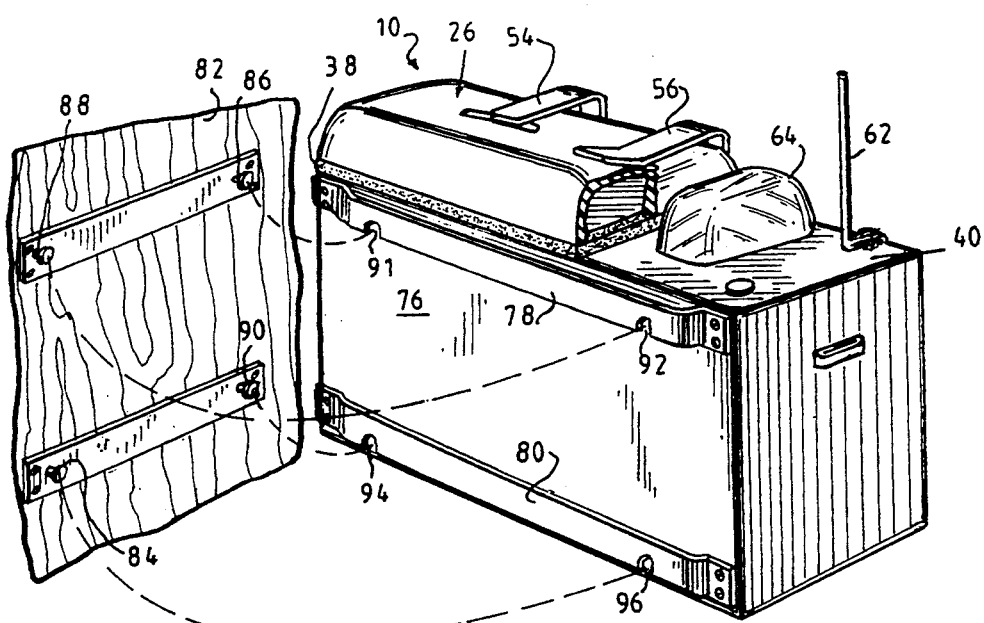
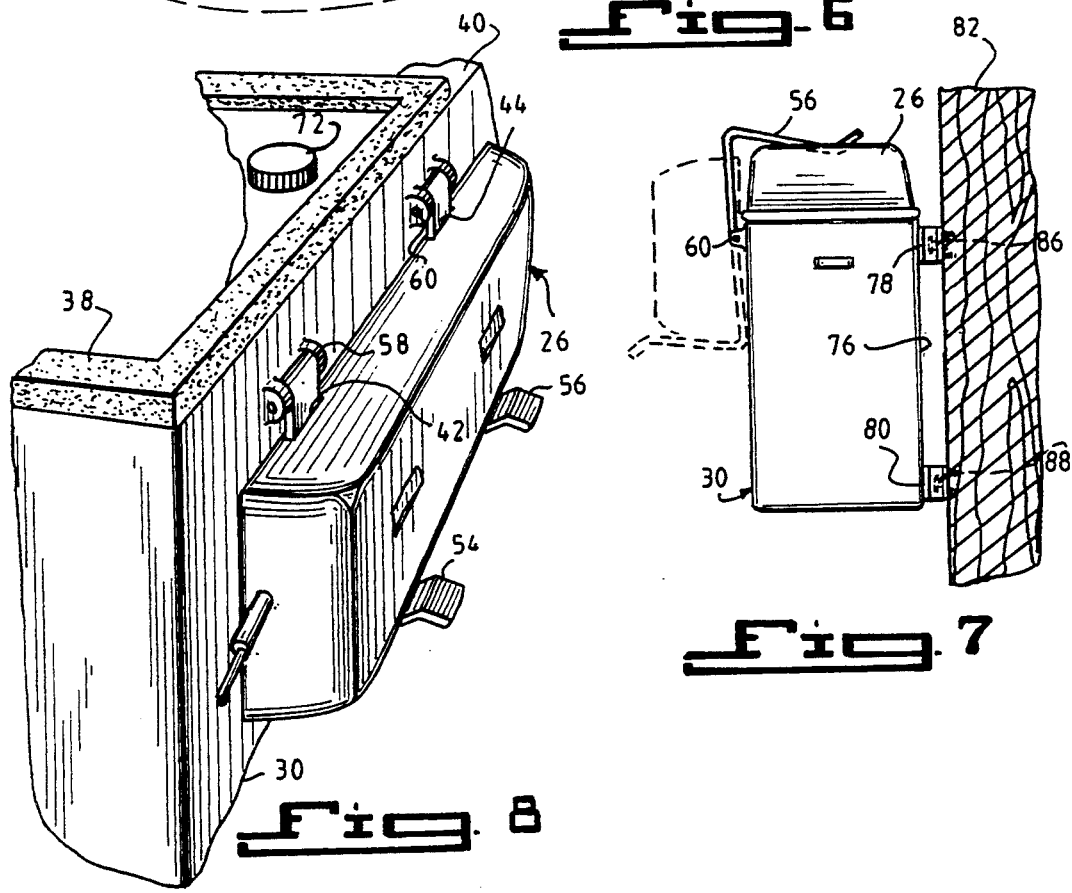

COMMUNICATION SIGNAL DEVICE

BACKGROUND OF THE INVENTION

1. Field of the Invention

The present invention relates to a communication device.

More particularly, the present invention relates to a communication signal device.

2. Description of the Prior Art

Numerous innovations for communication signal devices have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a communication signal device that avoids the disadvantages of the prior art.

This device will allow the user to communicate either verbally (by radio), visually (by light beacon) or through Emergency Position Indicating Radio Beacon (EPIRB). These 3 functions are supplied by a single common battery source. The battery source is rechargeable. This system is portable and can be transported by a single person. The radio frequency would be VHF, which has world wide acceptance or C.B. This system would have its own attached antennas for radio and EPIRB. A remote antenna could also be used for the radio.

The light beacon would have a high intensity strobe which could be seen for many miles.

This device could be used by outdoorsmen, boaters, pilots and civil and military authorities.

This device would be extremely durable and weather resistant.

This device could be used for normal verbal communication by the radio or to indicate distress by use of its light beacon or EPIRB.

In keeping with these objects, and with others which will become apparent hereinafter, one feature of the present invention resides, briefly stated, in a communication signal device mounted on a boat, including means that can be used verbally, means that can be used visually, and means through an emergency position indicating radio beacon.

In accordance with another feature of the present invention, a radio is used to signal verbally.

Another feature of the present invention is that a light beacon is used to signal visually.

Yet another feature of the present invention is that an emergency position indicating radio beacon is used.

Still another feature of the present invention is that the one integral unit contains all the electronic hardware and circuits.

Yet still another feature of the present invention is that it further comprises a pair of externally charged power jacks.

Still yet another feature of the present invention is that the one integral unit contains a transmitter cover with an integral microphone therein.

Another feature of the present invention is that the integral unit is substantially rectangular so as to be easily mounted to a wall.

Yet another feature of the present invention is that the non-corrosive integral unit is constructed from molded plastic.

Still another feature of the present invention is that the non-corrosive integral unit is constructed from stainless steel.

Yet still another feature of the present invention is that the transmitter cover contains the microphone and is connected to the integral unit by a cable.

Still yet another feature of the present invention is that the integral unit and the cover could be any color including international orange.

Yet another feature of the present invention is that it further comprises a waterproof gasket disposed between the integral unit and the cover.

Still another feature of the present invention is that it further comprises a fold-down antenna.

Yet still another feature of the present invention is that it further comprises a rear portion containing two horizontal bars one on the top and one on the bottom, the ends of the bars contain slots for mounting to a wall having projectiles standing out in the proper positions.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a first boat using the communication signal device of the present invention to contact a second boat;

FIG. 2 is a perspective view of the communication signal device of the present invention;

FIG. 3 is a perspective view of the transmitter and cover of the communication signal device of the present invention;

FIG. 4 is a perspective view with pieces taken away of the permanent connecting wire from the main device to the transmitter and cover with the cover in the down position;

FIG. 5 is a perspective view of the communication signal device of the present invention without the transmitter and cover;

FIG. 6 is a rear perspective view of the mounting brackets of the communication signal device of the present invention;

FIG. 7 is a side view of the mounted communication signal device of the present invention with the transmitter and cover in the closed position and in the open position in phantom; and FIG. 8 is a perspective view with pieces taken away of the communication signal device of the present invention with the transmitter and cover in the down position.

DETAILED DESCRIPTION OF THE PREFERRED EMBODIMENT

Referring now to the FIGS., the communication signal device 10 is mounted on the cabin 12 of a sail boat 14, in the water 15 having a hull 16 carrying the cabin 12. In addition, the boat sports a mast 16 with a large sail 18 and a small sail 20.

A person 22 is sailing the sail boat 14 by use of a wheel 24. The person 22 is holding in his right hand the transmitter cover of the communication signal device 26 and appears to be trying to contact the other sail boat 28.

FIG. 2 shows the communication signal device 10 alone with all its parts. The electronic case 30 houses all the circuits and related parts. The two recharging jacks for external power supply are shown by 98 and 100. The communication signal device 10 is also waterproof. Antenna jack 63 can be used with a connected or a remote antenna.

The case 30 and cover 26 are made of non-corrosive materials such as molded plastic or stainless steel. With the cover 26 properly attached, the unit 10, as a whole, will float.

The approximate dimensions of the communication signal device 10 are 12"W ×6"H ×6"L. The communication signal device 10 comes in several colors including international orange or yellow and weighs from 5 to 10 pounds.

A waterproof gasket 38 is fixed to the communication signal device 10 and sandwiched between case top 40 and the cover 26.

In FIG. 3, one can see the transmitter cover 26 which functions as the transmitter via microphone 41. A transmit button 39 is included. Cutouts 42, 44, 46, and 48 help seat the transmitter cover 26 while in its open position or closed position. Waterproof power switches 32 and 34 are for the strobe and EPIRB.

A permanent transmitter wire 50 connects the cover 26 to the case 30 permanently, as shown in FIG. 4. FIG. 5 is shown without the carrying strap 52 and the cover 26 off. The "L" shaped brackets 54 and are pivotally attached to the case 30 at their non-distal ends 58, 60. When the cover 26 is replaced, the "L" shaped brackets 54 and 56 are snapped over the cover 26 and holds the cover 26 in position. In FIG. 5, one can see the fold down antenna 62, the beacon 64, and the radio control panel 66. A voltmeter 68 shows the state of charge of the internal battery pack 70. The control panel 66 contains controls for the radio. Recharging jacks will supply power to the enclosed battery. Control panel 66 has control switch 72 and control 74 for radio volume, squelch, frequency, etc. FIG. 6 is a perspective view of how the communication signal device is mounted. The rear portion 76 of the communication signal device 10 contains two horizontal bars, one 78 screwed into the top, and the other 80 screwed into the bottom, as shown in FIG. 6. The ends of bars and 80 contain slots, one at each end.

On the wall 82 of the sail boat 14 are mounted four projectiles 84, 86, 88 and 90 that line up with the respective slots 91, 92, 94, and 96.

FIG. 7 shows the transmitter and cover 26 in its closed up position while showing its open down position in phantom.

FIG. 8 shows the transmitter and cover 36 in its open down position.

It will be understood that each of the elements described above, or two or more together, may also find a useful application in other types of constructions differing from the type described above.

While the invention has been illustrated and described as embodied in a communication signal device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A communication signal device mounted on a boat, comprising:
    a) means that can be used verbally;
    b) means that can be used visually;
    c) means that can be used through an emergency position indicating radio beacon;
    d) at least one integral unit contains all the electronic hardware and circuits, comprising externally charged power jacks, a transmitter, and a transmitter cover containing a separate microphone from a receiver and is connected to said integral unit by a cable with an integral microphone therein adding greater protection to microphone from damage and waterproofing, which is substantially rectangular so as to be easily mounted to a vertical surface;
    e) a non-corrosive integral unit is constructed from molded plastic, is constructed from stainless steel, having a cover chosen from a group consisting of international orange and other bright colors; and
    f) a waterproof gasket disposed between a radio unit and said cover comprising a fold-down antenna and a rear portion containing two horizontal bars one on the top and one on the bottom, the ends of said bars contain slots for mounting to a vertical surface having projectiles standing out in the positions.

* * * * *